United States Patent
Tsokos et al.

(10) Patent No.: US 12,321,159 B2
(45) Date of Patent: Jun. 3, 2025

(54) SYSTEMS, METHODS, AND MEDIA FOR MONITORING THE PRODUCTION PROCESS OF A PRODUCT

(71) Applicant: University of South Florida, Tampa, FL (US)

(72) Inventors: Chris Peter Tsokos, Tampa, FL (US); Lohuwa Mamudu, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 661 days.

(21) Appl. No.: 17/665,296

(22) Filed: Feb. 4, 2022

(65) Prior Publication Data
US 2023/0251640 A1    Aug. 10, 2023

(51) Int. Cl.
G05B 19/418    (2006.01)

(52) U.S. Cl.
CPC ..... G05B 19/4188 (2013.01); G05B 19/4183 (2013.01); G05B 19/41875 (2013.01); G05B 19/41885 (2013.01)

(58) Field of Classification Search
USPC ............................................... 700/96
See application file for complete search history.

(56) References Cited

U.S. PATENT DOCUMENTS

| | | | |
|---|---|---|---|
| 10,436,940 B2 | 10/2019 | Maucec et al. | |
| 10,754,959 B1 | 8/2020 | Rajasooriya et al. | |
| 2009/0240366 A1* | 9/2009 | Kaushal | G06N 20/00 700/110 |
| 2021/0374634 A1* | 12/2021 | Okimoto | G05B 19/4065 |
| 2022/0036482 A1 | 2/2022 | Tsokos et al. | |
| 2022/0230117 A1* | 7/2022 | Baer | G06Q 10/06393 |
| 2022/0269248 A1* | 8/2022 | Kronenbitter | G05B 19/41875 |

FOREIGN PATENT DOCUMENTS

| | | | |
|---|---|---|---|
| CN | 115481715 A | * | 12/2022 |
| CN | 117436618 A | * | 1/2024 |

(Continued)

OTHER PUBLICATIONS

CN-102831269-A (Year: 2012).*
TW-I721408-B (Year: 2021).*
CN_119087945_A (Year: 2024).*
CN_118847120_A (Year: 2024).*

(Continued)

*Primary Examiner* — Hien D Khuu
(74) *Attorney, Agent, or Firm* — Quarles & Brady LLP

(57) ABSTRACT

In accordance with some embodiments, systems, methods, and media for monitoring a production process of a product are provided. In some embodiments, a system comprises a remote server, a communications connection between the remote server and a facility database, at least one processor coupled to the communication system, and a memory device having stored thereon a set of computer readable instructions. The set of computer readable instructions cause the at least one processor to: receive a first set of data related to the production process, calculate a first monitoring index indicator for the production process based on the first set of data, receive a second set of data related to the production process after one or more performance variables of the production process are modified, calculate a second monitoring index indicator for the production process based on the second set of data, and output a result.

16 Claims, 11 Drawing Sheets

(56) References Cited

FOREIGN PATENT DOCUMENTS

DE          10393394 B4 * 10/2016   ......... G03F 7/70525
WO    WO-2020172913 A1 *  9/2020

OTHER PUBLICATIONS

CN_118193981_A (Year: 2024).*
CN_103745273_A (Year: 2014).*
Agarwal, Profit Maximization Rule, https://www.intelligenteconomist.com/profit-maximization-rule/, Copyright 2022 IntelligentEconomist.com, 4 pages.
Alenezi et al., The Effectiveness of the Squared Error and Higgins-Tsokos Loss Functions on the Bayesian Reliability Analysis of Software Failure Times Under the Power Law Process, Engineering, 2019, 11(5):272-299.
Ascher et al., Modification of Error Log Analysis: Statistical Modeling and Heuristic Trend Analysis, IEEE Transactions on Reliability, 1992, 41(4):599-601.
Bassin, Increasing Hazard Functions and Overhaul Policy, In Proceedings of the 1969 Annual Symposium on Reliability, pp. 173-180.
Chakraborty et al., A Real Data Driven Analytical Model to Predict Happiness, Feb. 9, 2021, pp. 1-24.
Li, Stochastic Models and Variable Returns to Scales in Data Envelopment Analysis, European Journal of Operational Research, 1998, 104:532-548.
Lynham, 7.3 The Structure of Costs in the Long Run, Principles of Economics, https://opentextbc.ca/principlesofeconomics/chapter/7-3-the-structure-of-costs-in-the-long-run/, 2019, 7 pages.

* cited by examiner

| Estimates | |
|---|---|
| $\widehat{MII}$ | $\hat{\theta}$ |
| 1.154595 | 0.034395 |

FIG. 6

| Estimates | | |
|---|---|---|
| $\widetilde{MII}$ | $\hat{\theta}$ | $\hat{V}(AC_L)$ |
| 1.6561 | 0.5298 | 5.9149 |
| -4.6094 | 0.8703 | -46.8777 |
| -4.9895 | 0.8568 | -60.2068 |
| 1.7169 | 0.4108 | 9.9585 |
| 2.0913 | 0.4613 | 14.2676 |
| 2.2809 | 0.4850 | 17.1356 |
| 3.8879 | 0.6149 | 37.5346 |
| -2.4047 | 1.5730 | -51.5574 |
| -2.3035 | 1.6139 | -56.4978 |
| -2.4805 | 1.5358 | -65.5206 |

FIG. 7

| Estimates | |
|---|---|
| $\widehat{MII}_{FL}$ | $\hat{\theta}_{FL}$ |
| 1.549066 | 0.3203303 |

FIG. 8

SYSTEMS, METHODS, AND MEDIA FOR MONITORING THE PRODUCTION PROCESS OF A PRODUCT

CROSS-REFERENCE TO RELATED APPLICATIONS

N/A

BACKGROUND

The monitoring, assessment, and evaluation of a production process are vital to the successful operation, functionality, longevity, and continuity of every firm, industry, or business engaged in production of a product. Profit maximization along with cost minimization is a goal of most firms engaged in production, along with meeting customer's demands, expectations, and satisfaction.

Existing monitoring techniques for production processes compare price (marginal revenue) and actual cost of production by a firm. However, such monitoring techniques are inaccurate and inefficient.

Accordingly, new systems, methods, and media for monitoring the production process of a product are desirable.

SUMMARY

In accordance with some embodiments of the disclosed subject matter, systems, methods, and media for monitoring the production process of a product are provided.

In accordance with some embodiments of the disclosed subject matter, a system comprises a remote server, a communications connection between the remote server and a facility database, at least one processor coupled to the communication system, and a memory device having stored thereon a set of computer readable instructions. The set of computer readable instructions cause the at least one processor to: receive a first set of data related to the production process, calculate a first Monitoring Index Indicator for the production process based on the first set of data, receive a second set of data related to the production process after one or more performance variables of the production process are modified, calculate a second Monitoring Index Indicator for the production process based on the second set of data, and output a result based on the first and second Monitoring Index Indicators.

In some embodiments, the result indicates an impact that the one or more modified performance variables had on the production process.

In some embodiments, the at least one processor detects the modification to the one or more performance variables.

In some embodiments, a user provides an indication to the system of the modification to the one or more performance variables.

In some embodiments, the at least one processor receives from an automated system an indication that the one or more performance variables have been modified.

In some embodiments, the performance variables are at least one from the group of: age of machinery, size of a production facility, and number of workers.

In accordance with some embodiments of the disclosed subject matter, a method of monitoring a production process of a product comprises receiving a first set of data related to the production process. The method further comprises calculating a first Monitoring Index Indicator for the production process based on the first set of data. The method further comprises receiving a second set of data related to the production process, after one or more performance variables of the production process are modified. The method further comprises calculating a second Monitoring Index Indicator for the production process based on the second set of data. The method further comprises outputting a result based on the first and second Monitoring Index Indicator.

In some embodiments, the method further comprises calculating an intensity value for each Monitoring Index Indicator that depends on a performance variable. The method further comprises determining the impact that each performance variable has on the production process based on the intensity values. The method further comprises generating a trained model based on the intensity values and corresponding impacts. The method further comprises increasing an output of the production process by modifying at least one performance variables based on the trained model.

In some embodiments, the trained model is a trained machine-learning model that is trained with one or more neural networks.

BRIEF DESCRIPTION OF THE DRAWINGS

For a more complete understanding of the embodiments and the advantages thereof, reference is now made to the following description, in conjunction with the accompanying figures briefly described as follows:

FIG. 6 shows results obtained from an evaluation of the data in FIG. 6 using mechanisms described herein.

FIG. 7 shows results obtained from an evaluation of 10 of the 168 observations from FIG. 4 using mechanisms described herein.

FIG. 8 shows results obtained from an evaluation of sixteen years of honey production in Florida using mechanisms described herein.

The drawings illustrate only example embodiments and are therefore not to be considered limiting of the scope of the embodiments described herein, as other embodiments are within the scope of the disclosure.

DETAILED DESCRIPTION

In accordance with various embodiments, mechanisms (which can, for example, include systems, methods, and media) for monitoring the production process of a product are provided.

The monitoring and evaluation of a production process can be useful to assess the operational existence and success of a firm's production. Conventionally, most firm's production processes may be evaluated using the behavior of the market price of the product produced and the average cost of production.

Figure 1A:
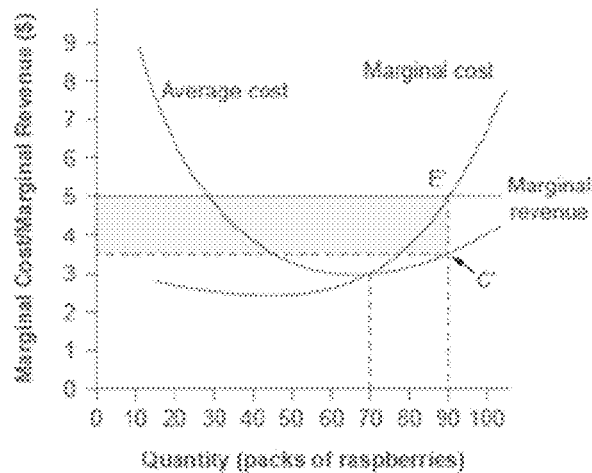
FIGS. 1A-1C illustrate conventional techniques of monitoring the production process of a product.
Figure 1B:
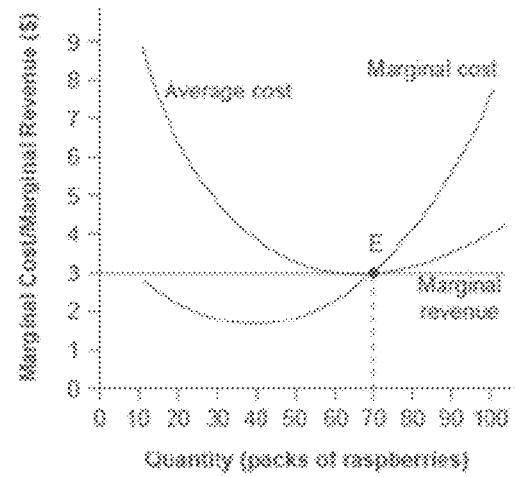
Figure 1C:
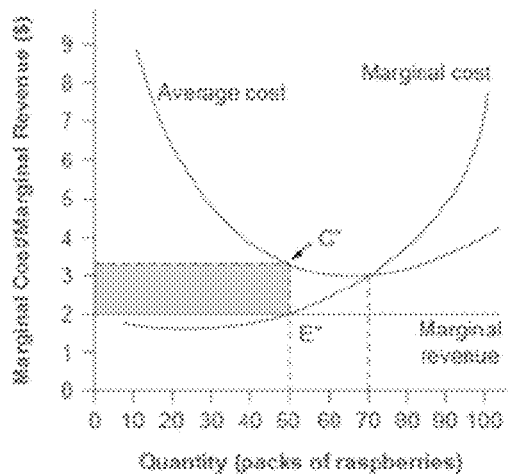

FIGS. 1A-1C illustrates conventional techniques of monitoring a production process of a product. For example, FIGS. 1A-1C explains how the price and average cost (AC) have been used in conventional methods to evaluate a short run production process of a firm. FIG. 1A shows when a production firm is making profit, and price (equal the marginal revenue, MR) is greater than AC. This is a stage where AC is falling, and production is rising. FIG. 1B shows when AC reaches its minimum, and production is at its maximum. FIG. 1C, often called "the shutdown stage," shows where the firm is losing (e.g., the price is less than AC). At the shutdown stage, most firms may be in a dilemma of whether or not to stay in operation since they may have already incurred the fixed cost of production. Interestingly, the conventional techniques of monitoring a production process of a product are only valid for perfectly market competitive firms.

Figure 2:
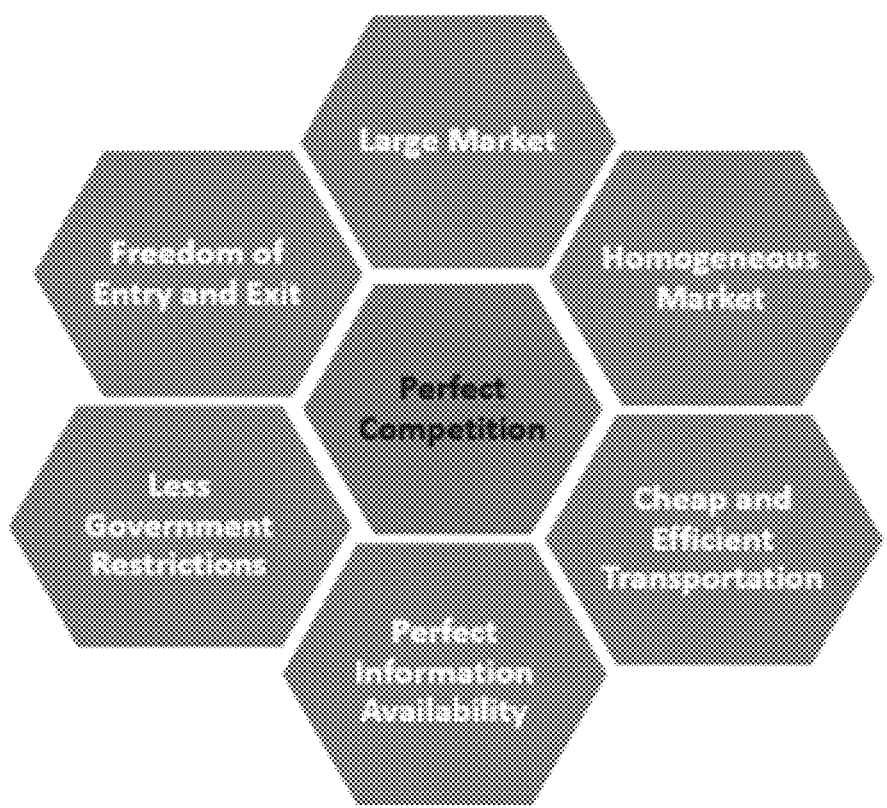
FIG. 2 illustrate characteristics of a perfectly competitive firm or market.

FIG. 2 illustrates characteristics of a perfectly competitive firm or market. A perfectly competitive firm or market may include a large market, a homogenous market, cheap and efficient transportation, perfect information availability, less government restrictions, and freedom of entry and exit. In recent times, considering the imperfection of available information, the continuous involvement of government (e.g., an increase in regulations), the interference in the economics of firms, as well as world organization (both private and government-owned) interference, it may be incredibly difficult to effectively establish and regulate a perfectly competitive firm (e.g., a firm that includes the characteristics of FIG. 2).

Most of the characteristics of a perfectly competitive firm have become void in the 21$^{st}$ century of business or production management and regulation. As a result, the conventional method of using price and AC to monitor, evaluate, and make necessary adjustments in a production process have become less effective. In the real world, it is tedious for firms to know exactly where their marginal revenue equals the marginal cost of the last product sold to adjust the production process. Hence, new systems, methods, and media for monitoring a production process of a product are desirable.

Referring again to FIGS. 1A-1C, a short-run production behavior of a small, single, or new firm or factory based on price and average cost is illustrated. However, what happens when the production firm expands it factory or market size? What happens when the production firm expands its output? At this point, each of the newly opened branches may experience the short-term effect of price and average cost, causing the firm to encounter several short-run average costs (SRAC) of production. The accumulation of the SRACs of production resulting in a long-run average cost (LRAC) of production of the firm. Therefore, the LRAC of production of a firm can be the summation or families of several SRAC. Thus, the LRAC can be the enablement of several short-run average costs of the production firm. The LRAC can describe a firm that is planning different levels of investment in fixed cost physical capital, knowing the different choices of capital investments, etc. In the short-run period, most firms may experience fixed costs and the only variable cost may be labor. In the long-run period, both the variable cost and the fixed cost (e.g., capital investment) are varied.

Figure 3:
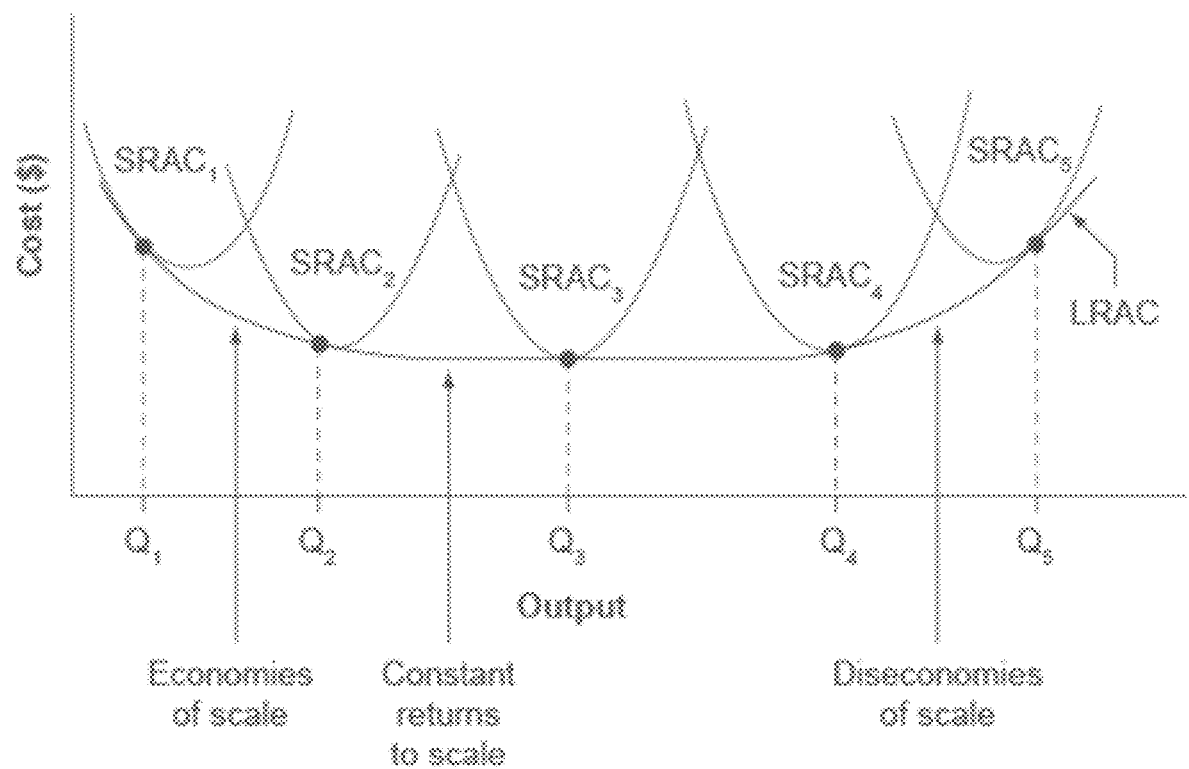
FIG. 3 illustrates an example long-run average cost production of a firm.

FIG. 3 illustrates an example long-run average cost production of a firm. Specifically, FIG. 3 demonstrates an LRAC curve, which encompasses five SRAC curves. The LRAC curve splits the firm's production into three phases or stages. The three phases or stages can be: the economies of scale, the constant economies return to scale, and the diseconomies of scale. The amount of production a firm wishes to produce may depend on the kind of economic phase, consequently the amount of cost that they can bear. For example, if a production firm plans to produce an output $Q_3$, the firms level of fixed cost and capital investment allocation would be at $SRAC_3$, which can allow the firm to produce at a minimum cost. It may be prudent for the firm to locate its cost and investment at $Q_2$, where it may not be sophisticated enough to produce $Q_3$, or $Q_4$, and where the cost and investment level can be too high to produce $Q_3$.

The various stages of production in a long-run period are characterized by several features that can be difficult to handle by merely manipulating the price and average cost of production. The market price of a product, on the other hand, is influenced by several factors including market demand and supply, consumer behavior, population size, etc. Hence, the strategy and concept of monitoring a production process using price and average cost may be deficient in recognizing how a production of a company can identify or know exactly when to produce at a particular level of output, and how reliable the system will be. It is the reliability of the systems (e.g., mechanical, electrical, etc.) that can drive the production process. If the system breaks, production halts (i.e., there is no production). Thus, the deficiencies of conventional method for monitoring a production process raise important questions: (1) What fixed cost and level of capital investment needs to be undertaken in the event of uncertainty? (2) How can a firm assess the useful life of factors of production at various phases of production in the long run? (3) When can a firm decide to increase output or make adjustments to a production process?

Methods, systems, and media for monitoring the production process of a product according to embodiments of the present disclosure can be useful to address these questions and others. Further, embodiments of the present disclosure address many of the deficiencies of conventional methods by proposing an improved analytical method to monitor and evaluate the behavior of a company's production process. Methods, systems, and media disclosed herein may use a nonlinear time dependent stochastic process known as Non-homogeneous Poisson Process (NHPP), that may also be known as the Power Law Process (PLP).

The NHPP, which may be referred to as the Power Law Process (PLP) or the Weibull process has been used in reliability growth modeling. In production, firms may want to assess and evaluate the reliability of a production process. It is the reliability of the system (e.g., mechanical, electrical, etc.) that drives the production process. If the system breaks, then there may be no production. For instance, if a production firm would like to know the reliability of their production process (e.g., if they are making a profit or a loss), they may determine whether to change one or more performance variables. For example, a production firm may choose to increase, decrease, or produce the same quantity of a product to alter their profit or loss result. As another example, the production firm may alter the quality and useful life of their production systems (e.g., equipment, machinery, etc.).

The NHPP contains an intensity function, which can measure the rate of change of the reliability growth process or system as a function of time. The intensity function can be given by Equation 1 below for MII>0, θ>0, and t>0. MII (Monitoring Index Indicator) and θ can denote the shape and scale parameters, respectively, and t can be the time behavior of the phenomenon under consideration.

$$V(t; MII, \theta) = \frac{MII}{\theta}\left(\frac{t}{\theta}\right)^{MII-1} \quad (1)$$

In a NHPP, if there are n failures of a given system at a time interval (0, 1], then the probability can be given by Equation 2 below, where V(t) is the intensity function of the process given by Equation 1, which is expressed in a reduced form as Equation 3.

$$P(x = n; t) = \frac{\exp\left\{-\int_0^t V(x)dx\right\}\left\{\int_0^t V(x)dx\right\}^n}{n}, t > 0, \quad (2)$$

$$P(x = n; t) = \frac{1}{n!}\exp\left\{-\frac{t^{MII}}{\theta}\right\}\left(-\frac{t^{nt}}{\theta}\right). \quad (3)$$

The Equation 2 above may be called the Nonhomogeneous Poisson Process (NHPP) or Power Law Process (PLP) or Weibull Process. For the NHPP, given n failure times, $T_1$, $T_2$, ..., $T_n$, where $T_1 < T_2 < ... < T_n$, then the truncated conditional probability distribution function $f_i(t|t_1, ..., t_{i-1})$ is the Weibull process and is given by Equation 4 below.

$$f_i(t | t_1, ..., t_{i-1}) = \frac{MII}{\theta}\left(\frac{t}{\theta}\right)^{MII-1}\exp\left\{-\left(\frac{t}{\theta}\right)^{MII} + \left(\frac{t_{i-1}}{\theta}\right)^{MII}\right\}, t_{i-1} < t. \quad (4)$$

Using the maximum likelihood method of parameter estimation, one can estimate the parameters of MII and θ in Equation 4. The likelihood function for Equation 4 when $T_1=t_1, T_2=t_2, ..., T_n=t_n$, can be expressed as Equation 5 below.

$$\ell = \quad (5)$$

$$L(t; MII, \theta) = \prod_{i=1}^{n} f_i(t | t_1, ..., t_{i-1}) = \left(\frac{MII}{\theta}\right)^n \exp\left\{-\left(\frac{t}{\theta}\right)^{MII}\right\}\prod_{i=1}^{n}\left(\frac{t_i}{\theta}\right)^{MII-1}$$

The shape parameter MII can be influenced by the largest failure time or the largest value of the phenomenon. One can find an estimation for MII by equating the partial derivative of l with respect to MII, letting the partial derivative be equal to zero, and then solving for MII, as shown below in Equation 6.

$$\frac{\partial \ell}{\partial MII} = 0; \widehat{MII} = \frac{n}{\sum_{i=1}^{n} \log\left(\frac{t_n}{t_i}\right)} \quad (6)$$

The scale parameter θ may be a function of MII. Similarly, the estimate of θ may be computed by equating the partial derivative of l with respect to θ and substituting the estimate of MII, given by Equation 7 below.

$$\frac{\partial \ell}{\partial \theta} = 0; \hat{\theta} = \frac{t_n}{n^{1/\widehat{MII}}} \quad (7)$$

Given the estimates of MII and θ, one can estimate the value of the intensity function V(t) or failure intensity used in modeling the reliability growth of a system at any given time t. V(t) can measure the rate of change in reliability growth as a function of time as a system deteriorates with wear-out, improves with repairs, or improves with application of new technology.

A decrease in V(t) implies that system failure or failure intensity is decreasing (e.g., the system is improving). When the system is improving, the estimated MII is less than 1. A rise in V(t) implies that there is an increase in system deterioration or failure intensity is increasing. When there is an increase in system deterioration, the estimated MII is greater than 1. If the estimated MII is greater than 1, then the system is wearing our rapidly and a high level of maintenance may be required to improve the production process. When there is no change in V(t), then the estimated MII is equal to 1 and the system reliability growth is constant.

Generally, the behavior of the change in the reliability growth model of a system may depend on the shape parameter MII of the intensity function. That is, one may be able to monitor and regulate system reliability growth behavior of a given phenomenon using the estimated MII value for that system. The estimated MII value can also be used to monitor and evaluate a production process of a product, as will be described further herein.

One can use the NHPP to monitor, assess, and evaluate the production process of a company (industry) based on the average cost (AC) of a product. The AC may be an important factor in a firm's production. The price a firm charges for a particular product may largely depend on the cost of producing it. Although, other factors may also influence the price of the product. The amount of output of production may be largely influenced by level of cost or investment. A firm with a high investment or cost is expected to obtain high output levels, and vise versa.

AC is the total production cost (TC) per number of units produced or total output of production (Q), i.e., AC=TC/Q. Thus, the AC is a function of TC and Q. Both TC and Q may be a function of time t, hence AC may also be a function of time t. Accordingly, AC can be rewritten according to Equation 8 below.

$$AC_t = \frac{TC_t}{Q_t}, t > 0. \quad (8)$$

For example, AC for year 1 of a production firm may be $AC_1=TC_1/Q_1$, year 2 of a production firm may be $AC_2=TC_2/Q_2$, and yearn of a production firm may be $AC_n=TC_n/Q_n$. The implication of Equation 8 is that, if $AC_t$ is increasing, then it means that $TC_t$ increases more than $Q_t$ increases. To the contrary, if $AC_t$ is decreasing, then it means that $Q_t$ increases more than $TC_t$ increases. If $AC_t$ remains unchanged, then it means that both $TC_t$ and $Q_t$ remain the same over time. What if the $AC_t$ is decreasing and $Q_t$ is decreasing instead of increasing? This is a possible situation that a production firm can encounter when it is not incurring new costs, but lacks adequate and effective technologies to increase the total output, hence $Q_t$ may be decreasing. Also, unusual or seasonal events can cause Q to be decreasing, even if AC is decreasing. Therefore, it may be misleading to assess and evaluate a production process based solely on the implications of Equation 8.

Given that one can rearrange $AC_t$ such that $AC_1 < AC_2 < ... < AC_n$ in ascending order of magnitude from the least value of AC to the largest value as a function of time, then the probability distribution behavior of AC follow the NHPP or PLP given by Equation 4. Given that the AC may be rearranged from smallest to highest level following the NHPP, one can proceed to compute an intensity function using Equation 1 to evaluate a failure intensity or changes in the production process as a function of time, and based on AC, given by Equation 9 below.

$$V(AC_t; MII, \theta) = \frac{MII}{\theta}\left(\frac{AC_t}{\theta}\right)^{MII-1} \quad (9)$$

Consequently, one can find an estimate of the shape parameter MII, and thus, evaluate the failure intensity in the production process based on the average cost (i.e., the intensity function, $V(AC_t)$). The estimate of the shape parameter MII and the scale parameter $\theta$ of the production process based on the average cost $AC_t$, which is a function of time, can be expressed according to Equation 10 below, where $AC_1 < AC_2 < \ldots < AC_n$ and n is the duration of the production.

$$\hat{MII} = \frac{n}{\sum_{i=1}^{n}\log\left(\frac{AC_n}{AC_i}\right)}; \hat{\theta} = \frac{AC_n}{n^{1/\hat{MII}}}. \quad (10)$$

Given that the estimated MII can be computed based on $AC_t$, one can interpret the changes in estimated MII as follows: If the estimated MII is less than 1, then the AC of production is falling, hence total output or quantity of production (Q) is rising. In other words, the rate of failure of production or estimated V(AC) is deteriorating. Therefore, the production process may require no changes (e.g., one or more performance variables do not need to change). If the estimated MII is greater than 1, then the AC of production is increasing, and Q is falling. This implies that the estimated V(AC) is increasing, hence the production process requires immediate adjustments (e.g., by modifying one or more performance variables). Finally, if the estimated MII equal to 1 (which is rare), then AC is constant, hence Q is constant. That is, estimated $V(AC_t)$ remains unchanged, and the production firm may decide whether or not to make changes to improves the production process (e.g., whether or not to modify one or more performance variables).

The NHPP or the PLP may be used to model the reliability growth of repairable and nonrepairable systems. Thus, the NHPP allows for the assessment of the useful life of machines, software, equipment, etc. that may be used in a system according to embodiments of the present disclosure. The cost of production may be a function of several factors including the cost of buildings, machines, repairs, equipment, labor, etc. Thus, using NHPP to monitor the production process, as described in accordance with methods and mechanisms herein, provides robust results for the reliability growth of the production of a firm.

Figure 4:
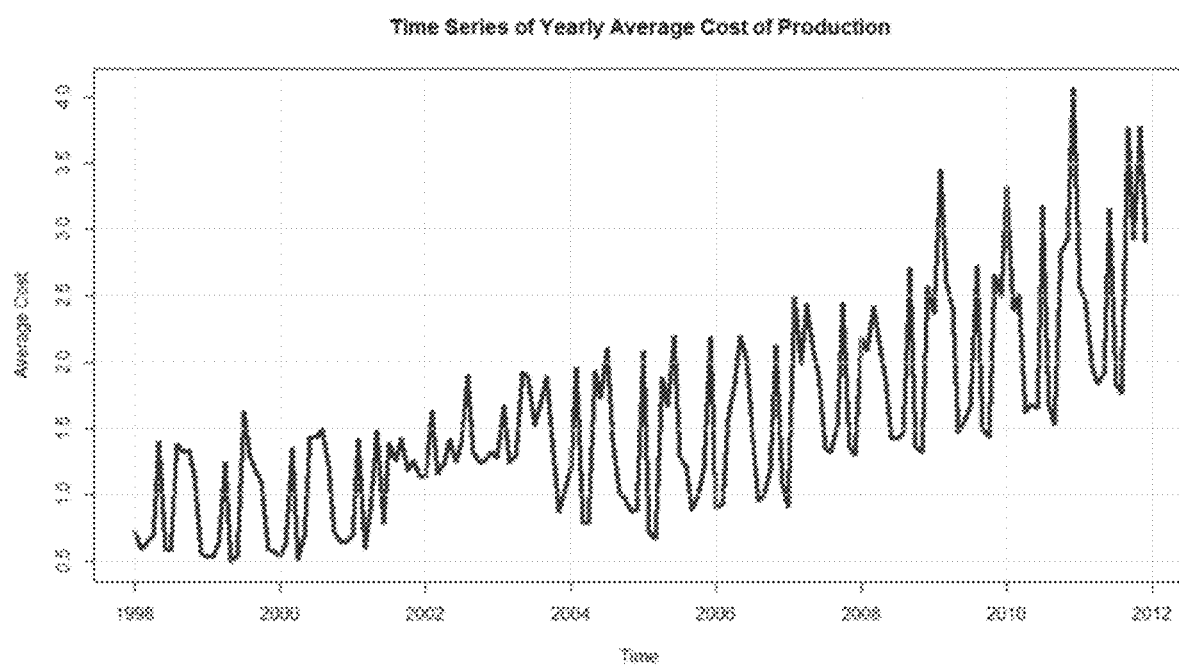
FIG. 4 illustrates an example time series of average production cost from honey production in the U.S. from 1998 to 2012 in accordance with some embodiments of the disclosed subject matter.

FIG. 4 illustrates an example time series of average production cost from honey production in the U.S. from 1998 to 2012 in accordance with some embodiments of the disclosed subject matter. The example time series of FIG. 4 is a nonstationary time series. Methods disclosed herein that outline using NHPP to monitor and evaluate a production process may be applied to honey production data as one example embodiment of the disclosed subject-matter (as shown in FIG. 4). The honey production data used to generate FIG. 4 was obtained from the National Agricultural Statistics Service (NASS) under the U.S. Department of Agriculture (USDA). The honey production data consists of the output of production or total production (Q) and the total value or the total cost of production (TC) of honey production of all of the states in the U.S. from 1998 to 2012. Each state provided a sample size of 16 observations; therefore, to increase the sample size, data from the entire southern region of the U.S. was utilized to provide a sample size of 168 observations for further analysis. Note that Q and TC may both be a function of time (year of production). Therefore, by computing the average cost (AC) using Equation 8, AC may also be a function of the year of production.

Generally, looking at FIG. 4, one can recognize that the AC of honey production increases over the sixteen-year duration of production. There also appears to be high volatility in the AC of production over the sixteen-year duration as shown by the back and forth wriggles in the time series plot. Between 2001 and 2004, the volatility seems relatively steady. Given the nonstationary time (year) series of the AC of production (shown in FIG. 4), one can rank or rearrange the AC from smallest to largest.

Figure 5:
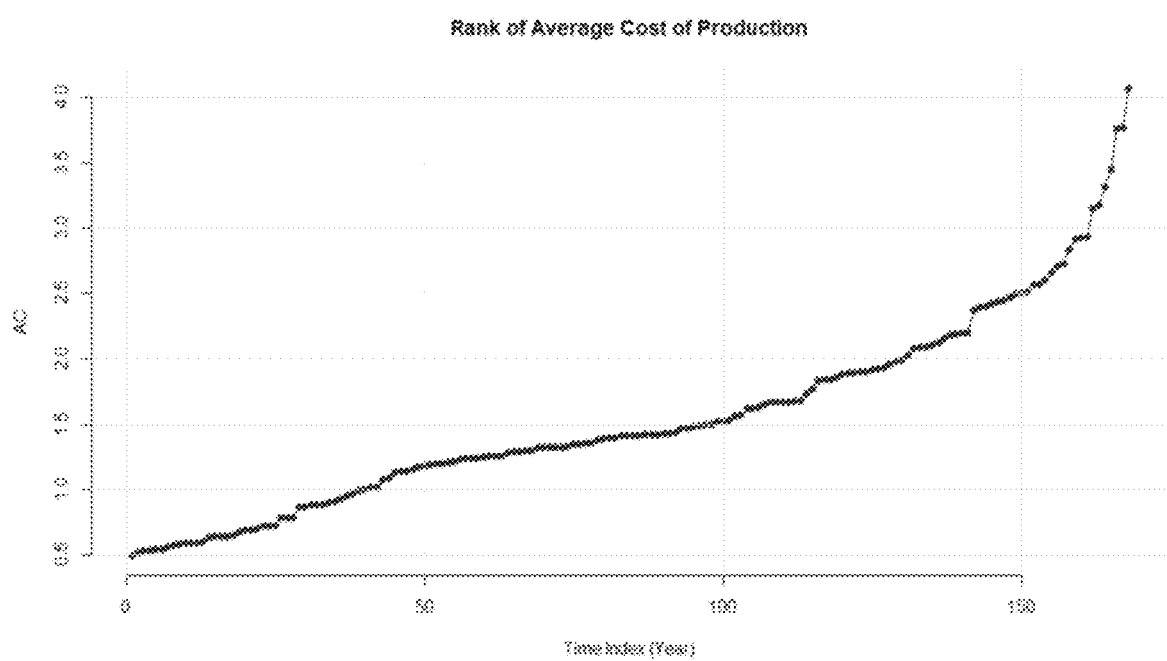
FIG. 5 illustrates a plot of rankings of average cost of production in accordance with some embodiments of the present disclosure.

FIG. 5 illustrates a plot of rankings of average cost of production in accordance with some embodiments of the present disclosure. In FIG. 5, the year time index is on the horizontal axis, and the ranking of the average cost of production is on the vertical axis. The probability distribution behavior of AC in FIG. 5 follows the nonhomogeneous Poisson process (NHPP) or power-law process (PLP) given by $AC_1 < AC_2 < \ldots < AC_{168}$. One can thus compute the estimated failure rate of production $V(AC_t$, estimated MII, estimated $\theta$) by estimating MII and $\theta$ using Equation 10. Consequently, one can evaluate the production process by assessing the behavior or changes in the estimated MII.

FIG. 6 shows results obtained from an evaluation of the data in FIG. 4 using mechanisms described herein. FIG. 6 shows an estimated MII (Monitoring Index Indicator) for the entire sixteen years of production. One can note that the estimated MII=1.15, which is greater than 1. This results implies that the AC of production is increasing, and hence, production is falling. Accordingly, one may conclude that the sixteen years of honey production (see FIG. 4) show that the rate of failure intensity of the production of honey is rising. One can see from FIG. 4 that AC is rising, which exactly corresponds to the value we had for estimated MII>1 after the sixteen years of production. The findings of this example embodiment according to mechanisms described herein suggests to the administration of the honey production firm to implement strategic changes to reverse the production process (e.g., by replacing machinery, repairing machinery, purchasing more land, hiring more workers, etc.). These findings justify the high quality and efficiency of methods, systems, and media disclosed herein for monitoring the production process of a product compared to conventional methods.

FIG. 7 shows results obtained from an evaluation of 10 of the 168 observations from FIG. 4 using mechanisms described herein. To compute the estimated MII, one can take into account the previous years' AC of production of the firm, if the firm has been in operation for more than a year. For example, the estimated values for the third year in FIG. 7 take into account the AC of production of the previous two years. This is a useful aspect of using embodiments of the disclosed subject matter because then one can evaluate both the current and previous years of a firm's production process, and how the firm's total production output may be impacted entirely.

FIG. 8 shows results obtained from an evaluation of sixteen years of honey production in Florida using mechanisms described herein. As shown in FIG. 8, the estimated MII for the sixteen years of honey production in Florida is 1.5491, which is greater than 1. This result implies that changes may have been required in the production process to improve the efficiency and output of the production of honey during that period.

From FIG. 7, one can monitor and evaluate the production process of honey using the estimated MII (Monitoring Index Indicator). Where the estimated MII is less than 1, it means that the failure intensity of the production process is decreasing. Thus, the total output of production is increasing, and the average cost decreases. In this scenario, the production process is efficient, and no alternation of performance variables is necessary. Also, the production systems and technologies can be said to be in good standing, and no extra costs or investments may be required to enhance the functionality and efficacy of the production process and total output.

By contrast, where the estimated MII is greater than 1, it means that there is appreciation in the failure intensity of the production process. This may be a result of the use of obsolete technologies. In this scenario, immediate adjustment of performance variables or corrective action may be required to improve the production process. The adjustment of performance variables could be repairing equipment, or maintenance of equipment depending on the extent of damage, age, and cost involved.

The regular period monitoring and evaluation of a production process using the Monitoring Index Indicator based on the AC may allow a production firm or industry to be aware of the state or condition of their production process so that firm managers may be notified to modify performance variables, where necessary. For instance, an estimated MII>1 does not mean that a firm or industry must change their entire production process. Rather, the firm or industry may consider cross-examining for possible problems in the current process, such as looking at maintenance, repairing, or replacing some faulty machines or equipment to enhance the production process. If a firm decides not to modify one or more performance variables after realizing that the current process has an estimated MII>1, then it can lead to a huge investment loss for the production firm or industry. Therefore, if management proceeds to alter one or more performance variables in the production process, these changes can be monitored using the methods, systems, and media disclosed herein to determine the positive or negative effect of the modified production process.

Embodiments of the present disclosure provide methods, systems and media for monitoring the production process of a product that do not rely solely on the AC of a firm's production. Using embodiments of the present disclosure, firms may not have to rely on the price of a product for their production models, which is beneficial because the price of a product may be outside of the firms control.

Performance variables such as defects, breakages, worn out parts, repairs, or removals in a production system can be assessed using mechanism disclosed herein. Also, since the AC of production is a function of time, mechanisms disclosed herein may be applicable at any given time of production including daily AC, weekly AC, monthly AC, and yearly AC.

Accordingly, the embodiments disclosed herein are practical, effective, and efficient for monitoring the production process of a product in any production firm, industry or factory.

Figure 9:
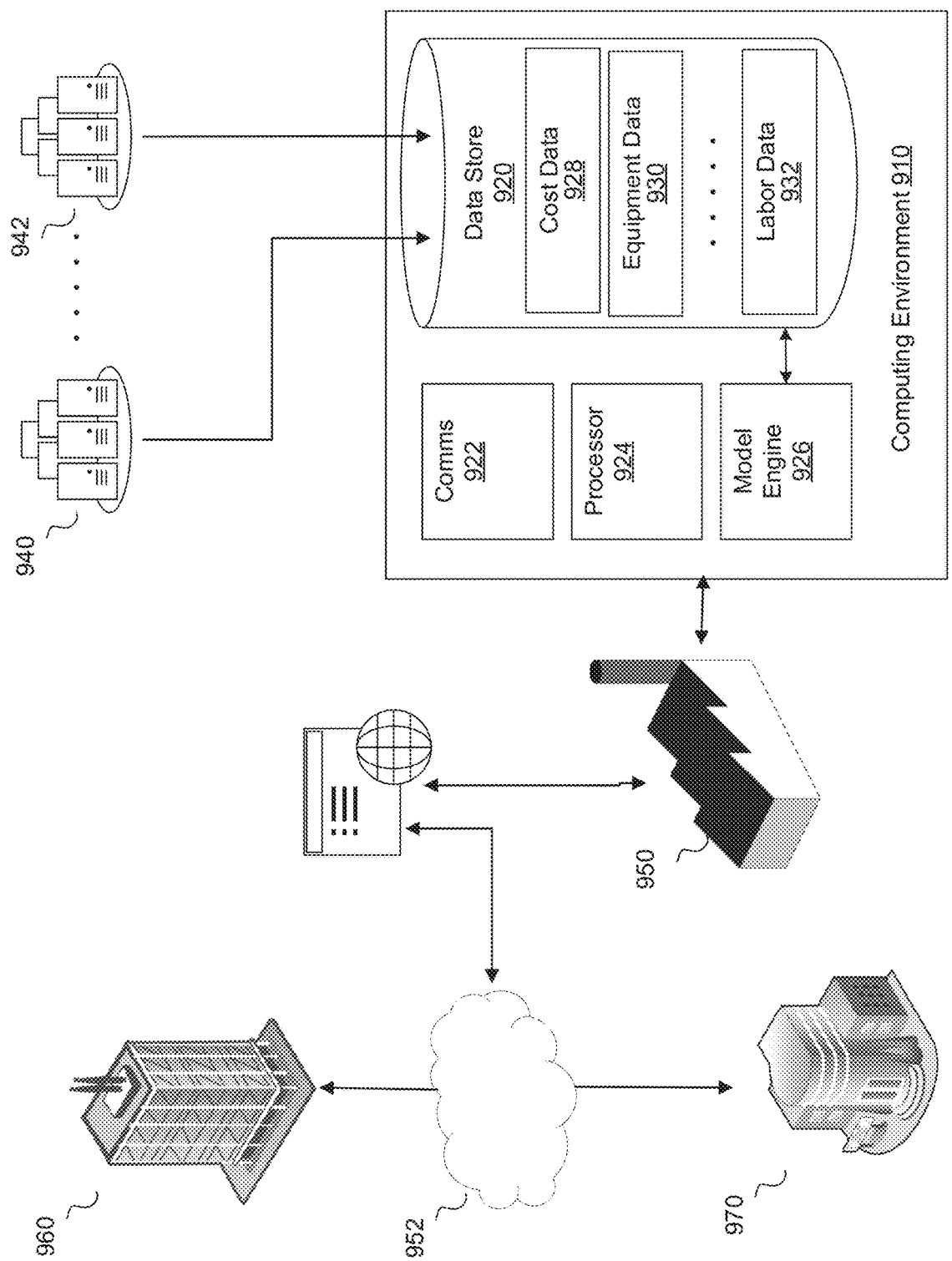
FIG. 9 shows an example of a system for monitoring the production process of a product in accordance with some embodiments of the disclosed subject matter.

FIG. 9 shows an example of a system for monitoring the production process of a product in accordance with some embodiments of the disclosed subject matter. A computing environment 910 comprises a data store 920, a communications connection 922, at least one processor 924, and a model engine 926. The computing environment 910 may be implemented via computing resources of a company or institutional network (e.g., local servers, company network) or may be implemented via a cloud computational resource (e.g., one or more remote servers). The communications connection 922 may be a suitable connection for allowing the computing environment to communicate with remote resources and users, such as any suitable Internet connection or LAN/WAN connection. The computing environment 910 can be coupled via communications connection 922 to one or more networks embodied by the Internet, intranets, extranets, wide area networks (WANs), local area networks (LANs), wired networks, wireless (e.g., cellular, 802.11-based (Wi-Fi), Bluetooth, etc.) networks, cable networks, satellite networks, other suitable networks, or any combinations thereof. The computing environment 910 can communicate with other computing devices and systems using any suitable systems interconnect models and/or protocols. The computing environment 910 can be coupled to any number of network hosts, such as website servers, file servers, network switches, networked computing resources, databases, data stores, and other network or computing platforms. In the illustrated embodiment, the computing environment is in direct communication with a facility database or data store 920.

Processor 924 may comprise a one or more processors of local servers, or may be implemented as a virtual processor/virtual machine. Processor 924 may include or be connected to a memory 926 that stores software instructions which cause the processor to execute and operate an application that implements the algorithms and techniques described herein. For example, memory 926 may comprise instructions implementing a model engine for monitoring or analyzing a production process of a product, as described herein, as well as executing the various communication and operational tasks described herein. The model engine 926 may be configured to develop and analyze the production process models described herein. In one example, the model engine 926 is configured to identify a plurality of performance variables and a corresponding impact (e.g., a weighted coefficient in an equation) that quantifies the performance variables contribution to returns of production for a product. The model engine 926 can also be configured to rank the plurality of performance variables from highest to least contributor, perform an optimization analysis to identify a value of attributable variables necessary to maximize the returns, and increase or decrease an impact of at least one of the plurality of performance variables to evaluate the model, among other functions described herein. Additionally or alternatively, the model engine stored in memory 926 and implemented by processor 924 can process data for a given factory/industry, machinery, location, etc. and provide specific Monitoring Index Indicators or intensity values to indicate whether a production process for a product may require modification of one or more performance variables to improve output.

Data store 920 may be a large database comprising data utilized for a variety of purposes, implemented via local network storage (e.g., on-site at a facility or factory as shown in FIG. 9) or cloud storage. Data store 920 may be in communication with one or more remote servers 940-42, in which case the computing environment simply retrieves data on an as-needed basis from the remote data services 940-42. Data store 920 may comprise data representing the key performance variables for a production process as described herein. The data may include cost data 928 (e.g., average cost of production); equipment data 930 (e.g., age of equipment, quality of equipment, technological sophistication of equipment); labor data (e.g., number of employees), and other information as described above. In one example, the cost data 928 can include the honey production data described above. In some embodiments, data store 920 may also collect data from individual users or automated processes that interact with the system.

The computing environment 910 can be implemented so as to perform one or more of a variety of functions for different types of users, through implementation of the models and algorithms described above. For example, the system 910 can provide services to individual factory operations or industries 950. In such an embodiment, the system 910 may implement a website or user portal 952 accessible by the user. The factory, industry, or other user 950 may upload certain data regarding their production process. The user may also indicate relative performance variables as various inputs to the production process, including age of machinery, size of a production facility (e.g., factory), and number of workers, etc., as well as typical yield and price data. Then the system 910 may process the data using the model engine 926 to determine whether or not modifications to the production process may be necessary. Further, the model engine 926 may make recommendations for the user regarding which inputs to spend more resources on and which inputs for which resources should be reduced. The recommendations may be based on calculated intensity values for each of the input performance variables.

For example, if the applied predictive model has a coefficient (weight) of a given identified performance variables that is positive, this indicates to the user that the factory operation output can maximize returns by increasing investment/expenditure of resources on this performance variables. Thus, the system 910 would recommend to the factory operation that it increase resource allocation to the given contributing factor (e.g., by purchasing new machinery, or purchasing a larger facility), to maximize the returns from the production of the product.

If the coefficient (weight) of an identified contributing factor is negative, this means that the factory operation can maximize its returns by decreasing investment of resources on that factor. In other words, the system 910 would recommend to the production firm that it can maximize returns by a reduction in the allocation of resources to that factor (e.g., investing less in machinery).

If there are two positive contributing factors to the returns from the production process, with one having a higher coefficient (weight) than the other, then the factor with a larger coefficient contributes more to maximizing the returns by increasing it more than the other. If there are two negative contributing factors to the returns from the production process, the one having a smaller coefficient (weight) than the other, then the risk factor with a smaller coefficient contributes more to decreasing the returns by reducing it more than the other.

By way of example, if a predictive model has the value of the coefficient (weight) for the opportunity cost of a larger facility to be negative, this means the production firm maximizes returns if there is a decrease in the opportunity cost of a larger facility for production. That is, if the firm does not lose more than it gains for utilizing/substituting a larger facility for production than other areas of investment, then the returns are expected to be maximized.

Hence, a firm, factory, or industry could recognize if one or more performance variables should be adjusted by calculating a Monitoring Index Indicator (MII) for their production process. Further, a firm, factory, or industry could then calculate an intensity value based on the MII to determine the impact that one or more performance variables has on the production process. One may then maximize returns by considering the combination of the identified contributing performance variables for a given predictive model, based on the impact (weighted coefficients) of the performance variables that drive the production process.

The impact (weighted coefficients) of the performance variables may be determined using analytical techniques that are readily apparent to one of ordinary skill in the art. For example, one may perform principal component analysis or singular value decomposition to determine the relation between one or more performance variables and subsequently calculate the respective impacts. Further, in some embodiments, one can train a machine-learning model, such as a neural network to determine the relation between one or more performance variables and subsequently calculate the respective impacts. In other embodiments, one may apply regression techniques, graphing techniques, inductive reasoning approaches, or other artificial intelligence evaluations to determine the relation between one or more performance variables and subsequently calculate the respective impacts.

In some embodiments, the factory 950 may then provide a new set of data related to the production process, after one or more performance variables of the production process are modified, to the portal 952, so that the system can obtain additional or replacement data for data store 920 showing revised cost data 928, equipment data 930, labor data 932, etc. This data could be used to calculate a revised Monitoring Index Indicator (MII) or intensity value for the production process to further refine the predictive model 926.

Alternatively, or in addition to the foregoing operation, the system 920 could also provide services to investment firms and other businesses 960 focused on production processes of a product. For example, the investment firm 960 may use the model engine 926 of the production facility 950 and a similar model engine of a second production facility to determine if a merger or acquisition between the two production facilities would collectively improve production output (e.g., MII<1 when the two production facilities are combined), or whether the merger or acquisition would not collectively improve production output (e.g., MII>1 when the two production facilities are combined). The investment firm 960 could also build and validate a predictive model for a specific product, taking into account both linearity and non-linearity of the performance variables for a production process at a given production facility. The model building may proceed using the steps described above.

Additionally, the system 910 could also be utilized by various governmental agencies, regulatory bodies, industry groups, or the like 970. For example, U.S. patent application Ser. No. 17/392,047, which is incorporated herein by reference in its entirety, describes how production models of crops in agricultural industries could guide subsidies and regulations regarding specific crops.

The computing systems and devices of environment 910 can be located at a single installation site or distributed among different geographical locations. The computing devices in such networks can also include computing devices that together embody a hosted computing resource, a grid computing resource, and/or other distributed computing arrangement.

Figure 10:
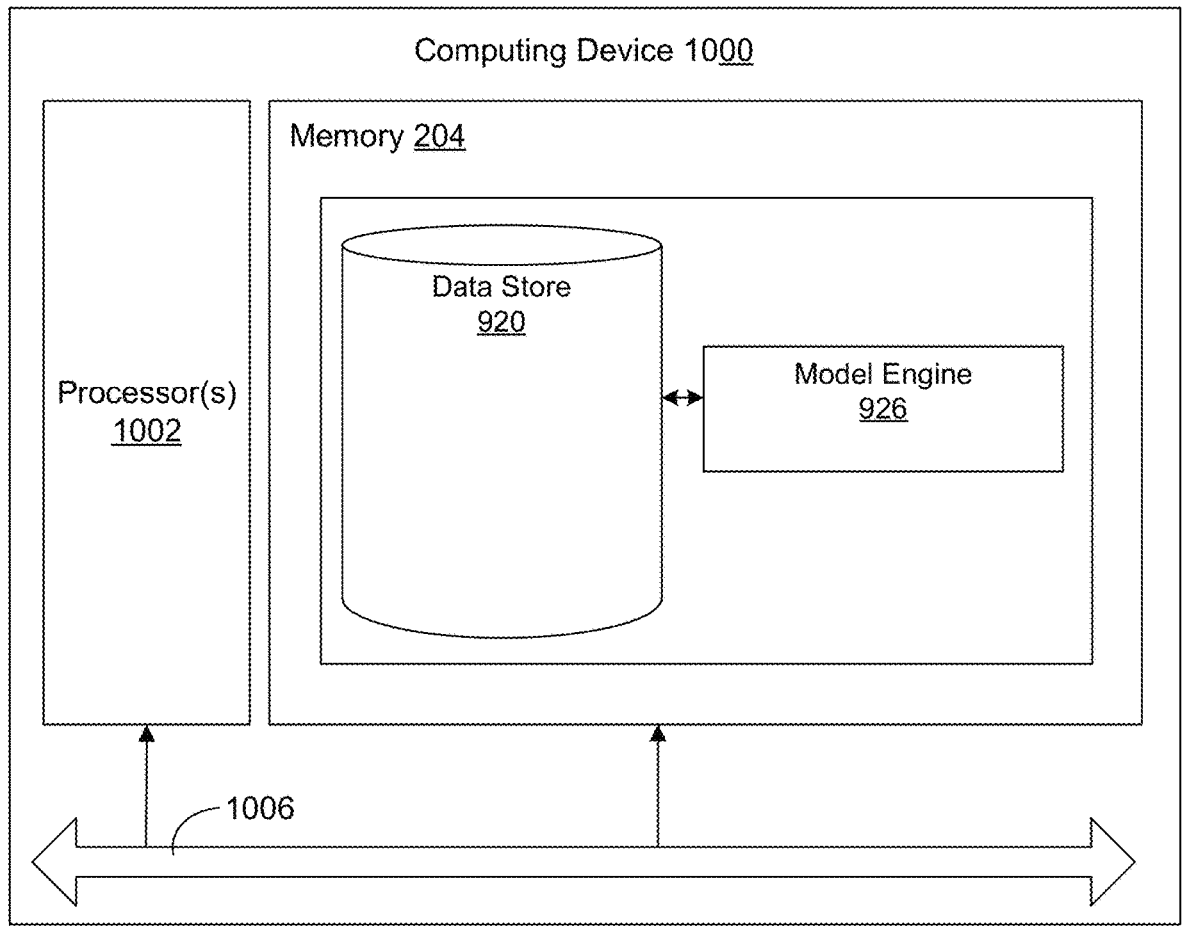
FIG. 10 shows an example of hardware that can be used to implement a computing device and a server, shown in FIG. 9 in accordance with some embodiments of the disclosed subject matter.

FIG. 10 illustrates an example schematic block diagram of a computing device 1000 for the computing environment 910 shown in FIG. 9 according to various embodiments described herein. The computing device 1000 includes at least one processing system, for example, having a processor 1002 and a memory 1004, both of which are electrically and communicatively coupled to a local interface 1006. The local interface 1006 can be embodied as a data bus with an accompanying address/control bus or other addressing, control, and/or command lines.

In various embodiments, the memory 1004 stores data and software or executable-code components executable by the processor 1002. For example, the memory 1004 can store executable-code components associated with the model engine 926 for execution by the processor 1002. The memory 1004 can also store data such as that stored in the data store 920, among other data.

It is noted that the memory 1004 can store other executable-code components for execution by the processor 1002. For example, an operating system can be stored in the memory 1004 for execution by the processor 1002. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 1004 stores software for execution by the processor 1002. In this respect, the terms "executable" or "for execution" refer to software forms that can ultimately be run or executed by the processor 1002, whether in source, object, machine, or other form. Examples of executable programs include, for example, a compiled program that can be translated into a machine code format and loaded into a random access portion of the memory 1004 and executed by the processor 1002, source code that can be expressed in an object code format and loaded into a random access portion of the memory 1004 and executed by the processor 1002, or source code that can be interpreted by another executable program to generate instructions in a random access portion of the memory 1004 and executed by the processor 1002, etc.

An executable program can be stored in any portion or component of the memory 1004 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 1004 can include both volatile and nonvolatile memory and data storage components. Volatile components are those that do not retain data values upon loss of power. Nonvolatile components are those that retain data upon a loss of power. Thus, the memory 1004 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 1002 can be embodied as one or more processors 1002 and the memory 1004 can be embodied as one or more memories 1004 that operate in parallel, respectively, or in combination. Thus, the local interface 1006 facilitates communication between any two of the multiple processors 1002, between any processor 1002 and any of the memories 1004, or between any two of the memories 1004, etc. The local interface 1006 can include additional systems designed to coordinate this communication, including, for example, a load balancer that performs load balancing.

As discussed above, model engine 926 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

Also, any logic or application described herein, including the model engine 926 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Figure 11:
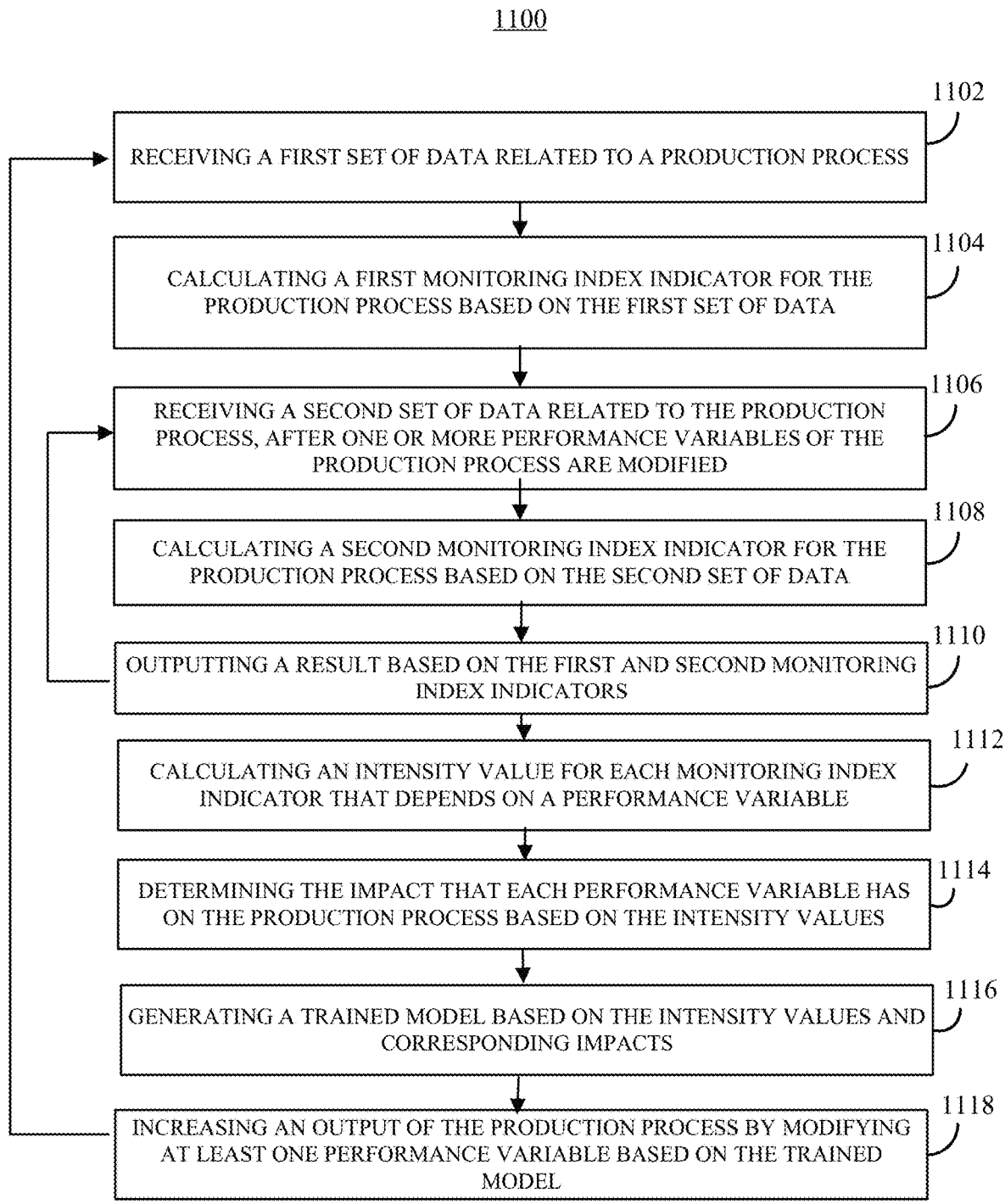
FIG. 11 shows an example of a process for monitoring the production process of a product in accordance with some embodiment of the disclosed subject matter.

FIG. 11 shows an example 1100 of a process for monitoring the production process of a product in accordance with some embodiments of the disclosed subject matter. At 1102, process 1100 can receive a first set of data related to a production process. In some embodiments, the first set of data can be cost data, such as cost of production data.

At 1104, process 1100 can calculate a first Monitoring Index Indicator for the production process based on the first set of data. The first Monitoring Index Indicator (MII) may be calculated using mechanisms described above.

At 1106, process 1100 can receive a second set of data related to the production process, after one or more performance variables of the production proves are modified. In some embodiments, the second set of data can be cost data, such as cost of production data.

At 1108, process 1100 can calculate a second Monitoring Index Indicator for the production process based on the second set of data. Similarly to 1104, the second Monitoring Index Indicator may be calculated using mechanism described above.

At 1110, process 1100 can output a result based on the first and second Monitoring Index Indicators. The result may be indicative of whether one or more performance variables should be modified to improve the production process. For example, if the Monitoring Index Indicator is >1, then whoever manages the production process may consider taking immediate action to make a change in the production process. However, if the Monitoring Index Indicator is <1, then no corrective action may be required.

The method 1100 can be iterative from 1106-1110. For example, if one or more performance variables are modified and the output still indicates that corrective action may be required (e.g., the Monitoring Index Indicator is >1), then whoever manages the production process may continue to modify one or more performance variables until the output at 1110 indicates that corrective action to the production process may no longer be required (e.g., the Monitoring Index Indicator is <1).

At 1112, process 1100 can calculate an intensity value for each Monitoring Index Indicator that depends on a performance variable. If 1106-1110 are iterated through multiple times, then there will be more than two Monitoring Index Indicators, and therefore more than two intensity values that each correspond to a change in one or more performance variables. As such, the intensity values may be helpful for quantifying the effect that modifying each of the one or more performance variables may have on the production process. Further, the magnitude of the intensity value may be indicative of the urgency with which a modification to the production process may be required. For example, if the Monitoring Index Indicator is much greater than 1, then corrective action to the production process may be more urgent than if the Monitoring Index Indicator is only slightly greater than 1.

At 1114, process 1100 can determine the impact that each performance variable has on the production process based on the intensity values. As discussed above, the impact may be a weighted coefficient for a respective performance variable in a production process. The impacts may be calculated using mechanisms described above.

At 1116, process 1100 can generate a trained model based on the intensity values and corresponding impacts. For example, the trained model may be a trained machine learning model where the impacts (weighted coefficients) are determined by one or more neural networks that take as input the performance variables and intensity values for a production process to determine the influence that modifying each performance variable may have on the output of the production process.

At 1118, process 1100 can increase an output of the production process by modifying at least one performance variable based on the trained model. For most firms, industries or factories, it is desirable to optimize profitability. Therefore, the trained model provides an efficient and accurate method by which a production firm may increase their output while tracking their capital investment to optimize profitability.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above-described steps of the processes of FIG. 11 can be executed or performed in any order or sequence not limited to the order and sequence shown and described in the figures. Also, some of the above steps of the processes of FIG. 11 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for monitoring a production process of a product, the system comprising:
   a remote server;
   a communications connection between the remote server and a facility database;
   at least one processor coupled to the communications connection; and
   a memory device having stored thereon a set of computer readable instructions which, when executed by the at least one processor, cause the at least one processor to:
   receive a first set of data related to the production process;
   calculate a first monitoring index indicator for the production process based on the first set of data;
   receive a second set of data related to the production process, after one or more performance variables of the production process are modified;
   calculate a second monitoring index indicator for the production process based on the second set of data; and
   output a result based on the first and second monitoring index indicators;
   wherein the result indicates an impact that the one or more modified performance variables had on the production process;
   wherein the processor is further configured, in coordination with the memory device, to:
   calculate an intensity value for each monitoring index indicator that depends on a performance variable;
   determine the impact that each performance variable has on the production process based on the intensity values;

generate a trained model based on the intensity values and corresponding impacts; and increase an output of the production process by modifying at least one performance variable based on the trained model.

2. The system of claim 1, wherein the trained model is a trained machine-learning model that is trained with one or more neural networks.

3. The system of claim 1, wherein the performance variables are at least one from the group of: age of machinery, size of a production facility, and number of workers.

4. The system of claim 1, wherein the at least one processor detects the modification to the one or more performance variables.

5. The system of claim 1, wherein a user provides an indication to the system of the modification to the one or more performance variables.

6. The system of claim 1, wherein the at least one processor receives from an automated system an indication that the one or more performance variables have been modified.

7. The system of claim 1, wherein the first set of data comprises first cost data.

8. The system of claim 1, wherein the receiving the second set of data, the calculating the second monitoring index indicator, and the outputting the result are iterated.

9. A method of monitoring a production process of a product, the method comprising:

receiving a first set of data related to the production process;

calculating a first monitoring index indicator for the production process based on the first set of data;

receiving a second set of data related to the production process, after one or more performance variables of the production process were modified by operators of the production process;

calculating a second monitoring index indicator for the production process based on the second set of data;

outputting a result based on the first and second monitoring index indicators, the result indicating to the operators of the production process a change in productivity due to the modification of the performance variables of the production process, wherein the result indicates an impact that the one or more modified performance variables had on the production process;

calculating an intensity value for each monitoring index indicator that depends on a performance variable;

determining the impact that each performance variable has on the production process based on the intensity values;

generating a trained model based on the intensity values and corresponding impacts; and increasing an output of the production process by modifying at least one performance variable based on the trained model.

10. The method of claim 9, wherein the trained model is a trained machine-learning model that is trained with one or more neural networks.

11. The method of claim 9, wherein the performance variables are at least one from the group of: age of machinery, size of a production facility, and number of workers.

12. The method of claim 9, wherein the at least one processor detects the modification to the one or more performance variables.

13. The method of claim 9, wherein a user provides an indication to the system of the modification to the one or more performance variables.

14. The method of claim 9, wherein the at least one processor receives from an automated system an indication that the one or more performance variables have been modified.

15. The method of claim 9, wherein the first set of data comprises first cost data.

16. The method of claim 9, wherein the receiving the second set of data, the calculating the second monitoring index indicator, and the outputting the result are iterated.

* * * * *